United States Patent

[11] 3,573,491

[72] Inventors Jerry E. Goss;
Roger R. Hansen, Owego, N.Y.
[21] Appl. No. 663,809
[22] Filed Aug. 28, 1967
[45] Patented Apr. 6, 1971
[73] Assignee International Business Machines Corporation
Armonk, N.Y.

[54] VIDEO LOGARITHMIC AMPLIFIER
11 Claims, 4 Drawing Figs.

[52] U.S. Cl. 307/229, 307/304, 328/145, 330/69, 330/95
[51] Int. Cl. G06g 7/12
[50] Field of Search 307/229; 328/145; 330/69, 95, 110; 235/197

[56] References Cited
UNITED STATES PATENTS

| | | | |
|---|---|---|---|
| 3,252,007 | 5/1966 | Saari | 328/145 |
| 3,317,850 | 5/1967 | Hilbiber | 330/69 |
| 3,320,530 | 5/1967 | Pearlman | 328/145 |
| 3,448,289 | 6/1969 | Harris | 328/145 |
| 3,456,128 | 7/1969 | Myers | 330/69 |

*Primary Examiner*—Donald D. Forrer
*Assistant Examiner*—David M. Carter
*Attorneys*—Hanifin and Jancin and Norman R. Bardales

ABSTRACT: A video (wideband) logarithmic amplifier employs a high gain differential amplifier that has an output stage which includes inter alia an element having a logarithmic transfer characteristic. The output stage generates a feedback signal to one of the input stages of the differential amplifier and maintains the input stages in a balanced condition in the absence of input signals applied to the other input stage as well as in response to input signals applied thereto.

INVENTORS
JERRY E. GOSS
ROGER R. HANSEN
BY
Norman R. Bardales
ATTORNEY

Patented April 6, 1971 3,573,491

2 Sheets-Sheet 2

VIDEO LOGARITHMIC AMPLIFIER

BACKGROUND OF THE INVENTION

This invention relates to logarithmic amplifiers and more particularly to video (wideband) logarithmic amplifiers.

As is well known to those skilled in the art, a logarithmic amplifier provides an output signal which is a logarithmic function of the input signal. Generally, the output signal represents the logarithm or exponent which corresponds to a number represented by the input signal. Alternatively, the output signal may represent the number or antilogarithm which corresponds to the logarithm or exponent represented by the input signal. Video logarithmic amplifiers are employed in many diverse applications such as for example in analog and/or digital data processing systems. In particular, video logarithmic amplifiers are especially adapted for use with pulse type signals. As is well known, the bandwidth necessary to transmit a video pulse train is determined inter alia by the rise and decay times of the pulses. This bandwidth *Fv* is approximately equal to one-half *Tr*, wherein *Tr* is the rise or decay time, whichever is the smaller, for the particular associated pulse. The state of the art for generating pulses having fast, i.e. shorter, rise and/or decay times has generally been improving. Heretofore, however, improvement in the state of the art of video logarithmic amplifiers for use with the improved pulse rise and/or decay time pulses has not been compatible. As a result, video log amplifiers of the prior art, because of their inherent characteristics, have been unable to provide high sensitivity, wide dynamic range, good pulse response, and short recovery time for use with the increased bandwidth pulse signals made possible by the shorter rise and/or decay time pulses now available. Furthermore, the logarithmic amplifiers of the prior art have been limited to applications utilizing pulse train signals having relatively small duty cycles and relatively small pulse repetition frequencies.

For example, in one particular video log amplifier of the prior art, the circuit is designed with a conventional operational amplifier utilizing a log diode arranged in a feedback manner. Because of the series impedance utilized in the input of the conventional operational amplifier, a stray or leakage capacitance is created across the input terminals and consequently deleteriously affect the response and recovery times of this prior art circuit, particularly in response to an input pulse train signal having a short rise time and/or a large pulse repetition frequency. Consequently, this particular prior art circuit is limited to accepting pulse train signals having a duty cycle of 50 percent or thereabouts and to pulse train signals having a relatively small pulse repetition frequency. In addition, the aforementioned stray capacitance along or in combination with a blocking capacitor, which is shunted across its input terminals and generally provided thereat, eliminates or mitigates the DC response of the circuit thereby making the circuit nonresponsive to DC signals such as an analog continuous input signal the level of which is changing in proportion or response to some analog function.

SUMMARY OF THE INVENTION

It is an object of this invention to provide an improved video logarithmic amplifier.

It is another object of this invention to provide a video logarithmic amplifier which is particularly useful for pulse train signals and particularly pulses having very short rise and/or decay times, i.e. large bandwidths.

It is still another object of this invention to provide a logarithmic amplifier which has high sensitivity, a good dynamic range, good pulse response, and/or very short recovery time.

Still another object of this invention is to provide a video logarithmic amplifier which selectively provides an output signal representing a logarithm or antilogarithm function of the input signal and/or is particularly adapted to be responsive both to AC and DC signal types.

According to the invention, there is provided a circuit having a differential amplifier stage. The output of the differential amplifier is coupled to an output stage which includes inter alia an element having a log transfer characteristic. The output stage is connected in a feedback manner to one of the inputs of the differential amplifier. The other input of the differential amplifier is fed by the input signals and the output stage provides an output signal which is logarithmically proportional to the input signal. The feedback signal maintains the differential amplifier in a balanced condition in the absence of input signals as well as in response to applied input signals.

Another feature of the circuit of the invention is the provision of selective means to provide output signals which are logarithmically or antilogarithmically related to the input signal.

The foregoing and other objects, features and advantages of the invention will be apparent from the following more particular description of a preferred embodiment of the invention, as illustrated in the accompanying drawings.

BRIEF DESCRIPTION OF THE DRAWING

In the FIGS., like elements are designated with similar reference numbers.

DESCRIPTION OF THE PREFERRED EMBODIMENT

Figure 1:
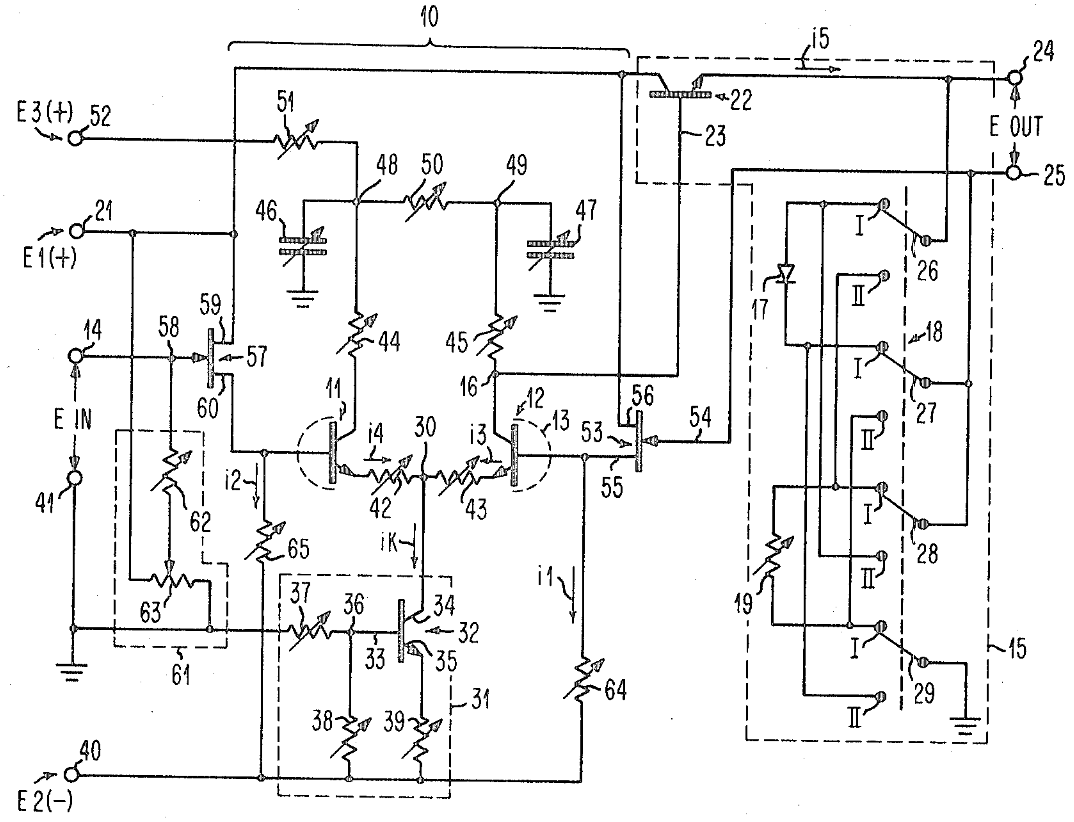
FIG. 1 is a schematic view of a preferred embodiment of the invention.

Referring to FIG. 1, there is shown a preferred embodiment of the video log amplifier circuit of the invention.

The circuit is provided with a difference amplifier stage indicated generally by the reference numeral 10 and hereinafter sometimes referred to as differential amplifier 10 or amplifier 10 for brevity. In the preferred embodiment, amplifier 10 is configured as being of the transistor emitter-coupled type. As such, each of the pair of amplifier substages of amplifier 10 is shown as having a respective NPN transistor indicated generally by the reference numerals 11 and 12, respectively. Transistors 11, 12 may be encased in a common envelope 13 so as to provide a substantially common temperature environment for the transistors 11, 12.

Amplifier 10 has a pair of inputs, one of which is coupled to input terminal 14. The other input of amplifier 10 is coupled to an output stage, indicated generally by the reference numeral 15, of the circuit and is fed by a feedback signal derived from stage 15 as will be explained in greater detail hereafter. The output of amplifier 10 is connected to the junction 16 and the signal present thereat is fed to the output stage 15.

In output stage 15, there is provided a circuit element having a logarithmic transfer characteristic, such as the diode 17, which in the preferred example is a semiconductor log diode. The diode 17 is biased in a forward direction and, as a result, the voltage across the diode is approximately proportional to the logarithm of the diode current. Diode 17 is connected serially by switch 18 to a second circuit element which has a linear transfer characteristic and in the preferred embodiment is an adjustable resistor 19. The voltage across resistor 19 will consequently be proportional to the antilogarithm of the diode current when elements 17 and 19 are serially connected. The current of diode 17 is obtained from a driver circuit. For this purpose, an appropriate power supply, not shown, is connected to terminal 21 and provides a positive voltage E1 thereat. Interposed between the terminal 21 and diode 17 is a gate or switching circuit means, e.g. NPN transistor 22. The output signal of amplifier 10 appearing at junction 16 is fed to the base 23 of transistor 22 and controls the action of transistor 22 and, consequently, the amount of current passing through the diode 17.

Switch 18, in addition to serially connecting elements 17 and 19, also selectively places one of the elements 17, 19 across the output terminals 24, 25 of the circuit of FIG. 1. Thus, for example, with the commonly ganged armatures 26—29 of switch 18 in contact with their respective associated upper contacts I as illustrated in the FIG., the diode 17 is shunted across output terminals 24,25 and the circuit of FIG. 1 operates in its log mode under these conditions. It should be noted under these conditions, that the resistor 19 is shunted across terminal 25 and ground and acts as a sensing element from which the aforementioned feedback signal for amplifier 10 is derived.

If, on the other hand, the armatures 26—29 are placed in contact with their respective associated lower contacts II, resistor 19 is shunted across terminals 24, 25 and the diode 17 is connected across terminal 25 and ground. Under these latter conditions, diode 17 acts as the sensing element from which the feedback signal is derived, and the circuit of FIG. 1 operates in its antilog mode.

The common emitter junction 30 of amplifier 10 is connected to a constant current generator or current sink 31, shown in the outline form for sake of clarity. By way of example, in the preferred example generator 31 includes NPN transistor 32 which has base, collector and emitter electrodes 33, 34, 35, respectively. Base 33 is connected to junction 36 of the bias network 37, 38 of generator 31. Collector 34 is connected to the junction 30 and emitter 35 is connected to current limiting resistor 39 of generator 31. The lower ends of resistors 38, 39 are connected to terminal 40. A suitable negative bias supply, not shown, is connected to terminal 40 and provides a voltage E2. The other end, which is remote from base 33, of resistor 37 is connected to the grounded input terminal 41. Generator 31 provides a constant current sink for the operating currents of transistors 11, 12.

The emitter and base circuits of transistors 11, 12 are symmetrical and balanced. Thus, the emitters of transistors 11, 12, which are identical transistor types, are connected to respective equal resistors 42, 53 which are in turn connected to junction 30. However, for purposes which will become apparent hereinafter, the collector circuits of transistors 11, 12 are not symmetrical, and, thus, are connected to nonequal current-limiting resistors 44, 45, respectively. Grounded bypass capacitors 46, 47 are connected to junctions 48, 49, respectively, and between which junctions is connected cross-coupling resistor 50. A resistor 51 connects junction 48 to terminal 52 to which is connected a suitable bias supply, not shown, that provides a positive voltage E3.

A high impedance isolation amplifier stage is provided in the input of amplifier 10 and is connected to the base of transistor 12. In the preferred embodiment, the high impedance stage is a field-effect transistor 53 FET which has control and output electrodes 54, 55, 56, respectively. Electrode 54 is connected to the feedback output of stage 15. Electrode 56 is connected to terminal 21 and electrode 55 is connected to the base of transistor 12.

In order to balance the inputs of amplifier 10, the base of transistor 11 is likewise connected to a high impedance isolation amplifier stage which, in the preferred embodiment, is also a field-effect transistor 57 FET having control and output electrodes 58, 59, 60, respectively. Control electrode 58 is connected to input terminal 14, and electrodes 59 and 60 are connected to terminal 21 and the base of transistor 11, respectively. Transistors 53 and 57 are identical types.

Biasing resistor network 61 includes resistor 62 and potentiometer 63 and is shunted across input terminal pair 14 and 41. Resistors 64 and 65 are current-limiting resistors in the output electrode circuits of transistors 53 and 57, respectively, which bias the base or control electrodes of transistors 12 and 11, respectively.

Initially, prior to the application of any input voltage *Ein* across terminals 14 and 41, the difference amplifier 10 is in a balanced condition. Under this condition, the input biases to transistors 53 and 57 are such that these transistors are conducting and their respective output currents *i1* and *i2* are equal. Currents *i1* and *i2* develop voltages across respective resistors 64 and 65 which bias transistors 12 and 11, respectively, for conduction. The output currents *i3* and *i4* of transistors 12 and 11, respectively, are regulated by the generator 31 such that the generator's constant current $iK=i3+i4$. In the preferred embodiment, with $Ein=0$, the currents *i3* and *i4* are substantially equal. As is well known to those skilled in the art, the input impedance of amplifier 10 at junction 30 is substantially related to the emitter-base circuits associated with transistors 11 and 12, and negligibly influenced by their collector circuits. Consequently, because of the balanced and symmetrical base and emitter circuits of transistors 11 and 12 provided in amplifier 10, the generator current *iK* will substantially divide equally between the output or collector circuits of transistors 11 and 12 when $Ein=0$, even though the respective impedance of their collector circuits are not equal. Thus, with $Ein=0$, the amplifier 10 is balanced. Resistor 45 is preadjusted so that the collector current of transistor 12 provides a bias to the base 23 of transistor 22 which allows the latter to conduct and develop a feedback voltage across the sensing element, which is diode 17 or resistor 19, as the case might be. The feedback voltage in turn biases transistor 53 sufficiently to establish or maintain the balanced condition of amplifier 10 when $Ein=0$.

The application of a positive input signal *Ein* across terminals 14 and 41 causes the levels of currents *i3* and *i4* in transistors 12 and 11 to change by equal amounts in a complementary manner. As a result, the output voltage at junction 16 causes a concomitant change in the input bias to transistor 22 which in turn changes the current through diode 17 and the resultant feedback voltage which biases transistor 53. The feedback voltage reestablishes the balanced condition of amplifier 10 and maintains the currents *i3* and *i4* in their respective aforementioned levels which are associated with the complementary change. The output voltage *Eout* present across terminals 24, 25 will be logarithmically proportional to the input voltage *Ein*. More specifically, if the diode 17 is connected across output terminals 24, 25, the output voltage *Eout* represents, i.e. is proportional, to the logarithm or exponent of the number represented by the input voltage *Ein* and the circuit of FIG. 1 operates in its log or logarithmic operational mode. If on the other hand, the resistor 19 is connected across output terminals 24, 25, the output voltage *Eout* is proportional to the antilogarithm or number of the logarithm or exponent represented by the input voltage *Ein* and the circuit operates in its antilogarithmic mode. The foregoing will become more apparent in connection with the following discussion of the waveforms of FIG. 2 and the characteristic curves of FIGS. 3 and 4.

Figure 2:
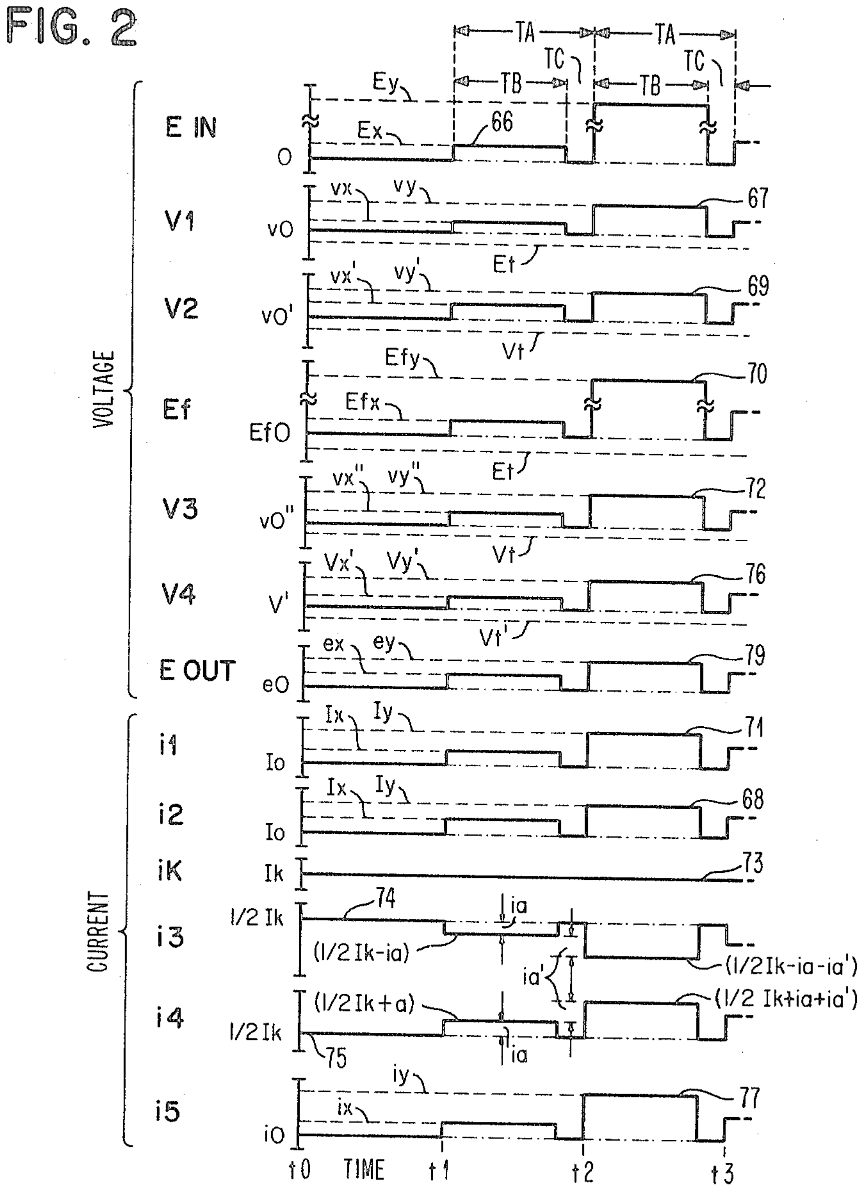
FIG. 2 is a waveform timing diagram of various voltages and current waveforms associated with the circuit of FIG. 1.

Referring to FIG. 2, it is assumed that the circuit of FIG. 1, for purposes of explanation, is in its logarithmic operational mode. For this particular case, the armatures 26—29 of switch 18 are in their illustrated upper positions and closed upon their respective contacts I. Accordingly, diode 17 is serially connected with resistor 19, the diode 17 is shunted across the output terminals 24, 25, and resistor 19 is the sensing or feedback element of stage 15. During the time period *t0* to *t1*, it is assumed, for purposes of explanation, no input voltage *Ein*, c.f. waveform 66, FIG. 2, is applied across input terminals 14 and 41. Consequently, amplifier 10 is in a balanced condition, as aforementioned. As shown by waveform 67, the bias voltage *V1*, which is present at the control electrode 58 of transistor 57, is at the amplitude level *v0*. Amplitude level *v0* is above transistor 57's threshold level *Et*. The resulting output current *i2*, c.f. waveform 68, of transistor 57 has an amplitude level *I0* which develops a bias voltage *V2*, c.f. waveform 69, at the base of transistor 11. The amplitude level *v0'* of voltage *V2* is above the threshold level *Vt* of transistor 11 and places the transistor 11 in a state of conduction.

During the same time period *tO—t1*, at the other input of amplifier 10, the feedback voltage *Ef*, c.f. waveform 70, from stage 15 is at a level *Ef0* that is above transistor 53's threshold level, indicated as being the same, to wit: *Et*, as its counterpart for identical transistor 57. Transistor 53 is thus conducting and its output current *i1*, c.f. waveform 71, is at the same level *I0* as its balanced counterpart current *i2*. Current *i1* provides an input bias voltage *V3*, c.f. waveform 72, to the base of transistor 12. Voltage *V3* has an amplitude level *v0''* which is above the threshold level of transistor 12. This threshold level is also indicated as *Vt* which is the same as its counterpart threshold level for identical transistor 11.

The constant current *iK*, c.f. waveform 73, of sink 71 is comprised of equally divided branch currents *i3* and *i4*, c.f. respective waveforms 74 and 75, of transistors 12 and 11, respectively. Thus, each of the currents *i3* and *i4* has an amplitude level ½*Ik* which is one-half the amplitude level *Ik* of the generator current *iK*. The output voltage *V4* c.f. waveform 76, at junction 16 of amplifier 10 biases the base 23 of transistor 22 at a level *V' which is above the latter's threshold level Vt'*. The level *V'* of voltage *V4* is sufficient to cause the diode 17 to operate at the lower end of the curve of the diode's current vs. voltage characteristic illustrated partially in FIG. 3. More particularly, the output current *i5*, c.f. waveform 77, of transistor 22 serially passes through diode 17 and resistor 19. It is of a sufficient amplitude level *i0* when *Ein*=0 to establish the level *EfO* of the feedback voltage *Ef* across the sensing element, which level *Ef0* maintains amplifier 10 in a balanced condition. In the particular case being described, the sensing element is resistor 19 and for purposes of explanation, the amplitude level *i0* of current *i5* is shown as coinciding with the operating point 78 of the current vs. voltage characteristic waveform shown in FIG. 3. At the same time, i.e. in the absence of an applied input voltage *Ein*, the level *e0* of the voltage *V5*, FIG. 3, across the diode 17 is of a negligible value. The voltage *V5*, in the particular case being described, is also the output voltage *Eout*, c.f. waveform 79 of FIG. 2, appearing across output terminals 24, 25. The level *e0* is selected to be below the useful curve of the input vs. output voltage characteristic of the circuit of FIG. 1 shown in FIG. 4 and described in greater detail hereinafter. Thus, in the absence of an input signal *Ein*, the circuit of FIG. 1 provides a negligible output signal *Eout*.

At time *t1*, it is assumed for purposes of explanation, the first pulse of the pulse train signal having a pulse repetition frequency *PRF*=1/*TA* is applied across terminals 14 and 41, c.f. input voltage *Ein* of waveform 66. Accordingly, the level of the input voltage *Ein* changes from the level 0 to the level *Ex*. The level of input bias *V1*, c.f. waveform 67, changes proportionally from *v0* to *vx*, causing the output current *i2* of transistor 57 to also change from the level *IO* to the level *Ix*, c.f. waveform 68. The bias voltage *V2* on transistor 11 also changes accordingly from a level *v0'* to a level *vx'*. Since the amplitude *Ik* of the current *iK* from current generator 31 remains constant, the amplitudes of currents *i3* and *i4* change in a complementary manner. Thus, during the pulse width or duration *TB* of the first input pulse of signal *Ein*, the levels of currents *i3* and *i4* decrease and increase, respectively, by equal amounts, *ia*. The change in the current *i3* causes the output voltage *V4* which biases transistor 22 to change from a level *V'* to a level *Vx'* moving the operating point of the diode 17 from the point 78 to the point 80 shown on the diode characteristic curve of FIG. 3. As a result, the feedback voltage *Ef* changes from a level *Ef0* to a level *Efx*. The voltage *Ef* is developed across the resistor 19 by current *i5* which is at the new amplitude *ix* and coincides with the new operating point 80. The new level *Efx*, in turn, causes the biasing current *i1* to become balanced with the current *i2*, such that the amplitude of *i1* equals the current amplitude *Ix* of current *i2*. With the current *i1* at the new level *Ix*, the input bias voltage *V3* of transistor 12 correspondingly goes from the level *v0''* to *vx''* and thereby rebalances the input stages of 10. Under these circumstances, the branch currents *i3* and *i4* remain in their new respective amplitude levels, to wit: (½*K*−*ia*) and (½*K*+*ia*), EinIt should be noted that the current *i3* and *i4*, during the pulse duration *TB* of the first input pulse are collectively equal to the generator's current amplitude *Ik*. The circuit 10 remains in this condition as long as the voltage *Ein*=*Ex* is applied to the terminals 14, 41. As a result, the output voltage *Eout*, which is taken across the diode 17 goes from a level *e0* to a level *ex* which corresponds to the diode's voltage *V5* at operating point 80 of FIG. 3.

Figure 4:
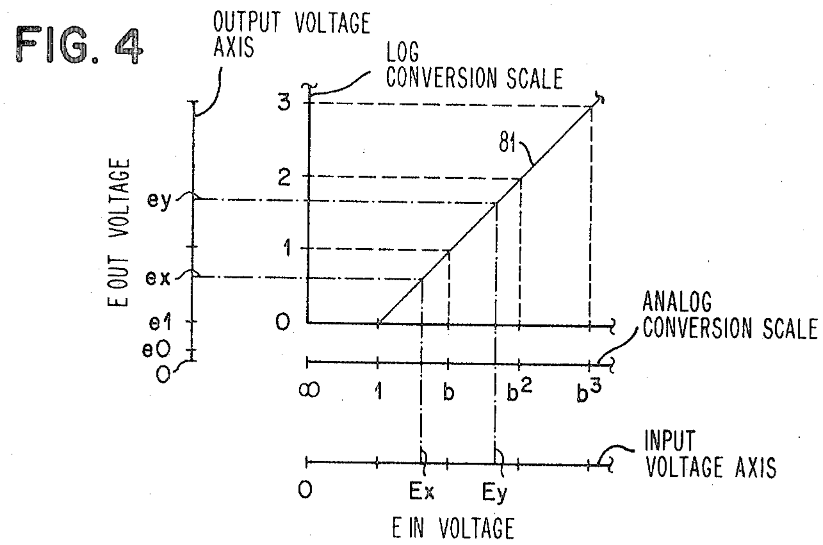
FIG. 4 is the output voltage vs. input voltage characteristic curve of the circuit of FIG. 1 in which the output voltage is plotted on the linear vertical axis and the input voltage is plotted on the log-scaled horizontal axis.
Figure 3:
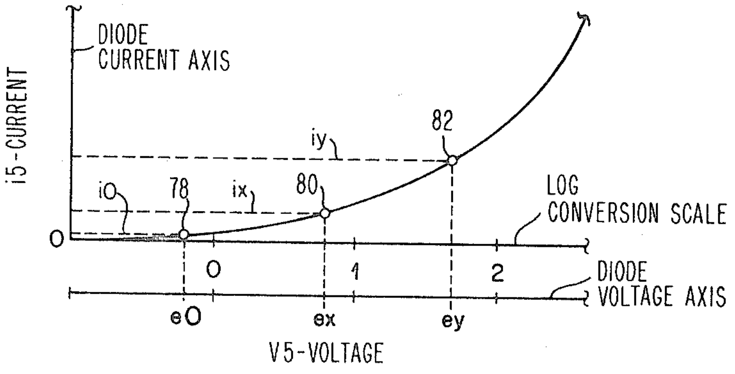
FIG. 3 is the logarithmic transfer characteristic curve in which the log current of the diode of FIG. 1 is plotted on the linear vertical axis and the diode voltage is plotted on the linear horizontal axis.

In FIG. 4 there is illustrated an input-output voltage characteristic curve 81 of the circuit of FIG. 1 for its logarithmic operational mode. In this case, as aforementioned, the output voltage *Eout* is exponentially related to the current of diode 17. Accordingly in FIG. 4, the output voltage *Eout* is plotted on the linear-scaled vertical OUTPUT VOLTAGE AXIS, and the input voltage *Ein* is plotted on the log-scaled horizontal INPUT VOLTAGE AXIS. Each of the levels of the plotted input voltage *Ein* corresponds to or represents a number *N* for which is to be obtained the corresponding logarithm or exponent in the particular logarithmal system of base or radix *b* which is being utilized. The log-scaled horizontal ANALOG CONVERSION SCALE illustrated in FIG. 4 corresponds to and converts these levels of the input voltage *Ein* into their respective corresponding numbers *N*. Similarly, the linear-scaled LOG CONVERSION SCALE of FIG. 4 converts the levels of the plotted output voltages to the logarithms or exponents *P* of the logarithmal system being utilized to which the output levels correspond or represent. The logarithmal system being utilized may be expressed mathematically by the following equation:

(1) $P=\mathrm{Log}_b N$, where *P* equals the exponent or logarithm of the number *N* in a logarithmal system having a base *b*. Thus, where the number *N*=1, the logarithm *P*=0 which corresponds to the output voltage level *e1* shown in FIG. 4. Similarly, for *N*=*b*, *P*=1; $N=b^2$, *P*=2; etc. It should be noted that by judiciously selecting the level *e0* of the output voltage to be below and/or near the level *e1* during the absence of an applied input voltage *Ein*, the output voltage level *e0* will occur below the useful part of the input-output characteristic curve 81 of FIG. 4, the useful part being indicated by the solid line portion of the curve. Thus, if a voltage level of signal *Eout* which is below level *e1* is detected at the output terminals 24, 25, it represents that no input voltage *Ein* or an input voltage of negligible value is being applied across terminals 14, 41. However, if an output voltage having a level *e1* or greater is detected at the output, the particular level will represent the logarithm of the input voltage *Ein* from which the resultant output voltage level is derived. For purposes of clarity and comparison, in FIG. 3 the linear-scaled LOG CONVERSION SCALE is shown in its corresponding relationship to the linear-scaled horizontal DIODE VOLTAGE AXIS of diode 17's voltage *V5*, which in the logarithmic operational mode of the circuit of FIG. 1 is also the output voltage *Eout*. In FIG. 3 the vertical DIODE CURRENT AXIS is also linear-scaled to illustrate the exponential waveshape or relationship of the curve shown therein.

Referring again to FIG. 2, and with reference to FIG. 4, the level *Ex* of the first input pulse, c.f. waveform 66, corresponds to a particular number *N* which is illustrated for purposes of explanation as having a value between the values 1 and *b*, c.f. ANALOG CONVERSION SCALE of FIG. 4. The resultant or derived output level *ex* of the associated first output pulse, c.f. waveform 79, accordingly represents the logarithm of the particular number and the logarithm has a value between the values 0 and 1 as is seen from the LOG CONVERSION SCALE of FIG. 4.

At the termination of the pulse duration *TB* of the first input pulse, the level of input signal *Ein* returns to the level 0 so that during the succeeding time period *TC* the waveforms of FIG. 2 return to their former respective levels. That is, these waveforms return to the same levels as they previously had during the time period $t0$—$t1$. It can be readily demonstrated that the circuit of FIG. 1 also responds to the level of the successive input pulses of the pulse train signal $Ein$ applied across terminals 14, 41 and provides, in its log operational mode, an output signal $Eout$ having a level which corresponds to the logarithm of the number represented by the level of the input signal $Ein$. Thus, for example, the level $Ey$ of the second input pulse of signal $Ein$, c.f. waveform 66, which is applied at time $t$ 2, *represents a number between the values* b and $b^2$, c.f. FIG. 4, and the output level $ey$ of the associated output pulse represents this number's logarithm which is shown in FIG. 4 as being between the values 1 and 2.

A circuit constructed in accordance with the preferred embodiment illustrated in FIG. 1 has the following values:

| | |
|---|---|
| Transistors **11**, **12** | Dual Type Sp8304 |
| Transistors **53**, **57** | Each Type FE 402 |
| Transistor **22** | Type 2N2484 |
| Transistor **32** | Type 2N914 |
| Diode **17** | Type SG5637 |
| E1, voltage | 12 volts DC, positive |
| E2, voltage | 12 volts DC, negative |
| E3, voltage | 35 volts DC, positive |
| Resistor **19** | 160 ohms |
| Resistors **37**, **38** | 560 ohms each |
| Resistor **39** | 200 ohms |
| Resistors **42**, **43** | 10 ohms each |
| Resistor **44** | 1,500 ohms |
| Resistor **45** | 3,000 ohms |
| Resistors **50**, **51** | 150 ohms each |
| Resistor **62** | 160 ohms |
| Resistor **63** | 10,000 ohms |
| Resistors **64**, **65** | 13,000 ohms each |
| Capacitors **46**, **47** | 45 uuf each |
| Input Sensitivity | 3 millivolts |
| Range of Input Signal | |
| Duration | 80 nanoseconds (pulsewidth of pulse type input signal) to DC (i.e. continuous type of input signal) |
| Range of Duty Factor | 0 to 100 percent. |
| Average Rise Time of Input Pulse, e.g. | 10 nanoseconds |
| Response Time, e.g. | 30 nanoseconds |
| Recovery Time | 70 nanoseconds |
| Dynamic Range | 60 decibels |

As can be readily seen from the above example, the video log amplifier of the present invention provides improved response and/or recovery times thereby providing an increased bandwidth characteristic. This makes the log amplifier circuit particularly adaptable for use with input pulse train signals having fast or short rise and decay times. Moreover, these improvements make the circuit particularly adaptable to input pulse train signals that have large duty factors ($TB/TA \times 100$ percent) which are 50 percent or greater, and that have large pulse repetition frequencies.

When the circuit of FIG. 1 is operated in an antilog mode, the armatures 26—29 of switch 18 are closed upon their associated contacts II and the diode 17 provides the feedback voltage whereas resistor 19 provides the output voltage as previously explained. Under this operational mode, the output voltage represents the antilogarithm or the number $N$ of the corresponding logarithm or exponent represented by the input signal. The curve of the output voltage versus input voltage characteristic, not shown, for the antilog operational mode, is modified accordingly in that the output voltage would be plotted on a log-scaled vertical axis, and the input voltage would be plotted on a linear or linear-scaled axis. The corresponding analog conversion values of the output voltage which represent the numbers $N$ would likewise be plotted on a log-scaled vertical scale or axis, whereas the corresponding log conversion values of the input voltage which represent the exponents or logarithms $P$ of the numbers $N$ would be plotted on a linear horizontal scale. The principles of operation of the circuit of FIG. 1 under its antilog mode is substantially the same as that of its log mode.

As is obvious to those skilled in the art, while the video log amplifier of the invention has been described with the use of input pulse train signals and is particularly adaptable for use therewith, it is to be understood that the invention could be practiced with the use of other types of input signals such as, for example, analog continuous input signal types wherein the level of the input signal is changing in proportion or response to some analog function or quantity. Furthermore, as is obvious to those skilled in the art, the circuit may be modified so that the operating currents $i3$ and $i4$ need not be balanced equally during the absence of an applied signal $Ein$ but may be balanced in an unequal manner as long as the relationship is provided wherein changes in the amplitude levels of currents $i3$ and $i4$ occur in a complementary manner when an input signal is applied. For example, the invention could be practiced with transistors 11, 12 which are not of identical characteristic types but transistors 11, 12 may have different characteristics but their coaction provides the aforementioned relationship. Moreover, the circuit of FIG. 1 can be modified to be configured with PNP transistor types with appropriate changes in voltage polarities being provided. Likewise, the semiconductor configuration of the inventive circuit could be practiced with its equivalent vacuum tube analogy, wherein the differential amplifier 10 would be of the cathode coupled type.

Thus, while the invention has been particularly shown and described with reference to a preferred embodiment, it will be understood by those skilled in the art that the foregoing and other changes in form and details may be made therein without departing from the spirit and scope of the invention.

We claim:

1. Circuit apparatus for providing an output signal logarithmically proportional to an input signal, said circuit apparatus comprising:

a differential amplifier stage having first and second input means, and first output means, one of said first and second input means being of the inverter type, and the other of said input means being of the noninverter type; and an output stage having third input means coupled to said first output means, feedback means coupled to said second input means, and second output means, a predetermined one of the output stage's last two mentioned means, to wit: said feedback means and said second output means, having a first element therein, with a log transfer characteristic, the other of said last two mentioned means having a second element in series coupling relationship with said first element, said second element coacting with said first element to provide an antilog transfer characteristic in said second element;

said apparatus developing said output signal across a predetermined one of said first and second elements whenever said input signal is applied to said first input means, and said apparatus developing a feedback signal across the other of said first and second elements, said feedback signal being applied to said second input means.

2. Circuit apparatus according to claim 1 wherein said input signal represents a number and said output signal represents the logarithm of said number in a predetermined logarithmal system.

3. Circuit apparatus according to claim 1 wherein said input signal represents a logarithm and said output signal represents its corresponding antilogarithm in a predetermined logarithmal system.

4. Circuit apparatus according to claim 1 wherein said feedback means provides a feedback signal to said second input means, said feedback signal maintaining said differential amplifier stage in a balanced condition in the absence and presence of input signals to said first input means.

5. A video log amplifier for providing an output signal logarithmically proportional to an input signal, said amplifier comprising:

a differential amplifier stage having first and second input means, and a first output means, one of said first and second input means being of the inverter type, and the other of said input means being of the noninverter type; and an output stage having third input means coupled to said first output means, feedback means coupled to said second input means for providing a feedback signal thereto, and second output means, a predetermined one of the output stage's last two mentioned means, to wit: said feedback means and said second output means, having a first element therein with a log transfer characteristic, the other of said last two mentioned means having a second element in series coupling relationship with said first element, said second element coacting with said first element to provide an antilog transfer characteristic in said second element; said video log amplifier developing said output signal across a predetermined one of said first and second elements whenever said input signal is applied to said first input means, said video log amplifier developing said feedback signal across the other of said first and second elements, and said feedback signal maintaining said differential amplifier stage in a balanced condition in the absence and presence of input signals to said first input means.

6. A video log amplifier according to claim 5 further comprising:

selective switching means having a first position for selectively switching the first element into said second output means and said second element into said feedback means to provide an output signal at said second output means which represents the logarithm of the number represented by the input signal applied to said first input means, and having a second position for selectively switching the first element into said feedback means and said second element into said second output means to provide an output signal at said second output means which represents the antilogarithm of the logarithm represented by the input signal.

7. A video log amplifier circuit according to claim 6 wherein said first and second input means comprise first and second high impedance isolation amplifier stages, respectively.

8. A semiconductor video log amplifier for converting an input pulse train signal into an output pulse train signal which is logarithmically proportional thereto, said amplifier comprising:

a differential amplifier having a pair of first and second transistorized amplifier stages, each of said amplifier stages having base, emitter and collector circuits associated therewith, said first and second amplifier stages being configured as a common emitter type, the respective base and emitter circuits of said first and second amplifier stages having a predetermined symmetry and said collector circuits thereof having a predetermined asymmetry, and first output means coupled to the collector circuit of said second amplifier stage for providing a control signal thereat;

first and second input means coupled to the base circuit of said first amplifier stage and to the base circuit of said second amplifier stage, respectively; and an output stage having a pair of first and second serially connected circuit elements, said first element being a semiconductor log diode, said second circuit element being a resistor, a semiconductor switch having a control electrode connected to said first output means, said semiconductor switch connecting the log diode in a forward direction bias, and second output means being provided across a predetermined one of said first and second circuit elements, the other of said first and second circuit elements providing a feedback signal thereacross and being coupled to said second input means; said video log amplifier providing said output pulse train signal at said second output means whenever said input pulse train signal is applied to said first input means, said feedback signal maintaining said differential amplifier in a balanced condition in the absence and presence of said input signal to said first input means.

9. A video log amplifier according to claim 8 wherein said first and second input means comprise first and second field effect transistors, respectively.

10. A video log amplifier according to claim 8 further comprising a transistorized constant current generator coupled to the junction of the emitter circuits of said first and second amplifier stages.

11. A semiconductor video log amplifier for converting an input pulse train signal into an output pulse train signal which is logarithmically proportional thereto, said amplifier comprising:

a differential amplifier having a pair of first and second transistorized amplifier stages, each of said amplifier stages having base, emitter and collector circuits associated therewith, each of said first and second amplifier stages being configured as a common emitter type, the respective base and emitter circuits of said first and second amplifier stages having a predetermined symmetry and said collector circuits thereof having a predetermined asymmetry, and first output means coupled to the collector circuit of said second amplifier stage for providing a control signal thereat;

first and second input means coupled to the base circuit of said first amplifier stage and to the base circuit of said second amplifier stage, respectively;

an output stage having a pair of first and second serially connected circuit elements, said first element being a semiconductor log diode, said second circuit element being a resistor, a semiconductor switch having a control electrode connected to said first output means, said semiconductor switch connecting the log diode in a forward direction bias, and second output means being provided across a predetermined one of said first and second circuit elements providing, the other of said first and second circuit elements providing a feedback signal thereacross and being coupled to said second input means; said video log amplifier providing said output pulse train signal at said second output means whenever said input pulse train signal is applied to said first input means, said feedback signal maintaining said differential amplifier in a balanced condition in the absence and presence of said input signal to said first input means; and selective switching means having a first position for selectively switching the log diode across said second output means and said resistor across said second input means, and having a second position for selectively switching the resistor across said second output means and said log diode across said second input means, said output signal at said second output means in said first position of said switching means representing the logarithm of the number represented by said input signal present at said first input means, and said output signal at said second output means in said second position of said switching means representing the antilogarithm of the logarithm represented by said input signal present at said first input means.